(12) United States Patent
Slezak

(10) Patent No.: US 7,553,585 B2
(45) Date of Patent: *Jun. 30, 2009

(54) BATTERY WITH HIGH ELECTRODE INTERFACIAL SURFACE AREA

(75) Inventor: Philip J. Slezak, North Ridgeville, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 846 days.

This patent is subject to a terminal disclaimer.

(21) Appl. No.: 11/051,313

(22) Filed: Feb. 4, 2005

(65) Prior Publication Data

US 2005/0170246 A1  Aug. 4, 2005

Related U.S. Application Data

(63) Continuation of application No. 10/251,002, filed on Sep. 20, 2002, now Pat. No. 6,869,727.

(51) Int. Cl.
*H01M 4/02* (2006.01)

(52) U.S. Cl. ........................ 429/209; 429/164; 429/128

(58) Field of Classification Search ................. 429/164, 429/165, 168, 169, 163, 176, 174, 211, 209, 429/208, 206, 224, 229, 128; 204/280, 288, 204/289

See application file for complete search history.

(56) References Cited

U.S. PATENT DOCUMENTS

| | | | |
|---|---|---|---|
| 323,902 A | 8/1885 | Brewer | |
| 466,798 A | 1/1892 | Nowotny | |
| 757,164 A | 4/1904 | Whitman | |
| 1,995,294 A | 3/1935 | Cullen | 136/114 |
| 2,605,298 A | 7/1952 | Marsal | 136/107 |
| 2,980,747 A | 4/1961 | Daley | 136/6 |
| 3,470,025 A | 9/1969 | Yehiely | 429/58 |
| 4,154,906 A | 5/1979 | Bubnick et al. | 429/94 |
| 4,315,062 A | 2/1982 | Clarizio | 429/246 |
| 5,281,497 A | 1/1994 | Kordesch et al. | 429/224 |
| 5,472,806 A | 12/1995 | Meintjes | 429/165 |
| 5,532,078 A | 7/1996 | Redey et al. | 429/104 |
| 5,677,080 A | 10/1997 | Chen | 429/167 |
| 5,869,205 A | 2/1999 | Mick et al. | 429/164 |

(Continued)

FOREIGN PATENT DOCUMENTS

FR  2622359  4/1989

(Continued)

OTHER PUBLICATIONS

Linden, *Handbook of Batteries*, 2nd ed., 1995, New York, pp. 40.3-40.5 and 40.23-40.25.

*Primary Examiner*—Raymond Alejandro
(74) *Attorney, Agent, or Firm*—Russell H. Toye, Jr.

(57) ABSTRACT

An electrochemical battery cell in accordance with the invention has a high electrode interfacial surface area to improve high rate discharge capacity, and the shapes of the electrodes facilitate the manufacture of cells of high quality and reliability at high speeds suitable for large scale production. The interfacial surfaces of the solid body electrodes have radially extending lobes that increase the interfacial surface area. The lobes do not have sharp corners, and the concave areas formed between the lobes are wide open, to facilitate assembly of the separator and insertion of the other electrode into the concave areas without leaving voids between the separator and either electrode.

20 Claims, 9 Drawing Sheets

U.S. PATENT DOCUMENTS

| | | | |
|---|---|---|---|
| 6,074,781 A | 6/2000 | Jurca | 429/209 |
| 6,203,941 B1 | 3/2001 | Reichert et al. | 429/137 |
| 6,207,322 B1 | 3/2001 | Kelsey et al. | 429/206 |
| 6,342,317 B1 | 1/2002 | Patel et al. | 429/176 |
| 6,410,187 B1 | 6/2002 | Luo et al. | 429/206 |
| 6,458,483 B1 | 10/2002 | Hamano et al. | 429/177 |
| 6,869,727 B2 * | 3/2005 | Slezak | 429/164 |

FOREIGN PATENT DOCUMENTS

| | | |
|---|---|---|
| GB | 2231196 | 11/1990 |
| WO | 0033397 | 6/2000 |
| WO | 0108244 | 2/2001 |
| WO | WO 01/08244 * | 2/2001 |

* cited by examiner

BATTERY WITH HIGH ELECTRODE INTERFACIAL SURFACE AREA

CROSS-REFERENCE TO RELATED APPLICATIONS

This application is a continuation of U.S. patent application Ser. No. 10/251,002, filed Sep. 20, 2002, entitled Battery with High Electrode Interfacial Surface Area, which issued as U.S. Pat. No. 6,869,727 on Mar. 22, 2005, and which is hereby incorporated by reference.

BACKGROUND

This invention relates to electrochemical cell batteries, particularly to cells with increased interfacial surface area between the positive and negative electrodes.

Batteries containing electrochemical cells are used as power sources for electrical devices. An ideal battery would be one that is inexpensive, with unlimited capacity regardless of power level, temperature or operating conditions. It would also have an unlimited storage life, be safe under all conditions, and be impossible for the user to misuse or abuse. While such an ideal battery is not possible, battery manufacturers continue to design batteries that will come closer to that ideal. In a practical battery, there are tradeoffs and compromises that must be made among the ideal battery characteristics related to battery performance. Thus, the requirements of the electrical devices that will be powered by the battery are important factors in battery and cell design. For example, many devices have battery compartments that limit the size and shape of the battery or batteries, and the discharge characteristics of the battery/batteries must be sufficient to operate the device under expected conditions of use.

Manufacturers are continually trying to increase the capabilities and the number of features of electrical devices. This results in ever-increasing demands for batteries that will provide higher power without unacceptable sacrifices in the other desirable battery performance characteristics, such as long discharge life (high capacity), long storage life, resistance to leakage, and ease of manufacture. This trend in increasing power requirements is evident in portable devices with consumer-replaceable batteries.

Achieving high battery capacity and long discharge life is especially challenging at high discharge rates required for high power because batteries are able to deliver only a fraction of their theoretical capacity, and that fraction (the discharge efficiency) decreases as the discharge rate increases. There are many factors that contribute to the discharge efficiency of batteries and the cells they contain. One factor is the interfacial surface area between the electrodes. Increasing the interfacial surface area generally has positive effects on current density, internal resistance, concentration polarization, and other characteristics that can effect discharge efficiency. However, increasing the interfacial surface area often comes at the expense of reduced active materials and theoretical discharge capacity. In designing a cell with increased interfacial surface area it is desirable to minimize necessary reductions in active materials, increases in inert components, and increases in expensive materials that do not themselves improve performance, as well as any other changes that reduce the theoretical capacity or otherwise offset improvements.

Some consumer batteries use active materials and/or electrolytes that are especially well suited for high power applications. Examples include primary lithium batteries and rechargeable (secondary) nickel/cadmium batteries. These batteries often use materials that are relatively expensive, have special handling requirements, or raise environmental concerns in the disposal of spent batteries. Because high interfacial surface area is generally preferred for high rate/high power applications, these batteries often have spiral wound electrode designs. However, these designs usually have more internal volume consumed by separators and current collectors and are generally more difficult and expensive to manufacture than bobbin designs.

The use of alkaline zinc/manganese dioxide batteries can solve these problems if the device does not exceed their power requirements. There is a need to improve the high power capability of alkaline batteries to make them suitable as power sources for higher power devices.

In a cylindrical alkaline $Zn/MnO_2$ cell with a bobbin-type construction, high rate discharge performance can be improved by increasing the electrode interfacial surface area. Typical commercial cells of this type have a positive electrode disposed next to the can. This positive electrode (cathode) has essentially a hollow cylindrical shape with a smooth, round internal surface, within which the separator and negative electrode (anode) are disposed. The electrode interfacial surface area can be increased by changing the internal surface of the positive electrode so that it is no longer smooth. One convenient way to do this, which is compatible with typical cell manufacturing processes in use, is to corrugate the positive electrode surface, with the corrugations running vertically (i.e., parallel to the can side walls when the positive electrode is assembled into the can). In general, the higher the surface area, the better the high rate discharge capacity. Additional improvement in high rate discharge capacity may also be realized if the cathode thickness is generally reduced, since this will tend to reduce polarization of the positive electrode.

There have been previous attempts to improve the high power capability of alkaline batteries by increasing electrode interfacial area. Examples can be found in U.S. Pat. No. 5,869,205, No. 6,074,781 and No. 6,342,317. However, each of these references suffers from one or more of the following disadvantages.

Manufacture of cells is difficult when a current collector prong must extend into each of a plurality of like-polarity electrodes. This means that each current collector prong must be aligned with one of the plurality of electrodes, requiring orientation of both the cell and the current collector. In addition, when multiple current collector prongs are required, the volume of active materials must be reduced to allow for an increase in the total volume of the collector, compared to cell designs in which a single current collector prong will suffice.

The use of typical separator materials (e.g., polymeric film and woven or nonwoven paper or fabric) in strip or sheet form may be impractical due to difficulty in making the separator conform to the surface of the cavity in the cathode. Even application of a spray-on separator to the interfacial surface of one of the electrodes can be difficult. Sharp corners and non-vertical interfacial surfaces can also make it difficult to completely fill the cavity with anode at the high speeds desirable in manufacturing.

When discharge efficiency is maximized by making the maximum distance of active material in a first electrode from an interfacial surface of a second electrode, the resulting first electrode shape can create various problems during cell manufacture: (1) difficulty in inserting the separator so that the entire interfacial surface of the first electrode is covered by separator without leaving voids between the electrode and the separator, (2) difficulty in keeping the separator against the first electrode surface so gaps do not develop before, during or after insertion of the second electrode, and (3) preventing the formation of air pockets between the second electrode and separator during high speed cell assembly. Such electrode shapes also tend to include relatively fragile lobes or projections extending from the electrode surfaces, making breakage more likely during electrode forming and handling, as well as during and after assembly of the electrodes and separator into the cell container.

The smaller diameter cells (e.g., AA/R6 and AAA/R03 sizes) are particularly susceptible to the above problems due to more the more limited spaces available and the need to make the electrode dimensions smaller.

In view of the above principles, an object of the present invention is to provide an electrochemical battery cell that is inexpensive and easy to manufacture, has high capacity, performs well under expected temperature and operating conditions, has long storage life, is safe, and is not prone to failure as a result of misuse or abuse by the user.

Another object of the present invention is to provide a battery cell that has improved high rate/high power discharge performance with minimal adverse effects on theoretical capacity, discharge performance at moderate and low rates, and other desirable battery cell characteristics.

It is also an object of the present invention to provide an economical battery cell with electrodes having a high interfacial surface area.

In view of the above problems with cell designs having high electrode interfacial surface area, it is a further object of the present invention to provide an economical, reliable alkaline zinc/manganese dioxide battery cell with a bobbin-type electrode configuration, capable of high speed mass production, that has a high electrode interfacial surface area.

SUMMARY

The above objects are met and the above disadvantages of the prior art are overcome by an electrochemical battery cell of the present invention. The present invention is directed to an electrochemical cell battery. The cell comprises a housing with an upstanding side wall, a first electrode comprising a first active material, a second electrode comprising a second active material and disposed within the first electrode, a separator disposed between the first and second electrodes, and an electrolyte. At least one of the first and second electrodes comprises a solid body, a surface of which defines a surface of a cavity in which the other of the first and second electrodes is disposed. The surface of the cavity comprises a plurality of radially extending lobes that form a plurality of concave and convex areas in the surface of the solid electrode body, each convex area has no radius less than 0.030 inch (0.76 mm), and each concave area has no radius less than 0.030 inch (0.76 mm).

An embodiment of the invention may have a third electrode which also comprises a solid body. In such an embodiment the third electrode may be of the same polarity as the first electrode and be disposed within the second electrode such that the first and third electrodes define the cavity within which the second electrode is disposed. The first electrode comprises an external surface of the cavity, and the third electrode comprises an internal surface of the cavity. In another such embodiment the third electrode may be of the same polarity as the second electrode and be disposed outside the first electrode such that the second and third electrodes define the cavity within which the first electrode is disposed. In this embodiment the third electrode comprises an external surface of the cavity, and the second electrode comprises an internal surface of the cavity.

In another embodiment of the invention the first electrode is a solid body, the external surface of which has a shape conforming to a shape of the upstanding wall of the housing. The internal surface of the first electrode has radially inward extending lobes that form concave areas. The second electrode is disposed within the cavity in the first electrode and has an external shape defined by a shape of the cavity in the first electrode and the separator.

In another embodiment the second electrode is a solid body, and the external surface of the second electrode and the upstanding wall of the housing define the cavity within which the first electrode is disposed. The second electrode comprises a plurality of radially outward extending lobes forming a plurality of concave areas in the external surface of the second electrode. The external and internal shapes of the first electrode are defined by a shape of the upstanding wall of the housing and by an external shape of the external surface of the second electrode and the separator, respectively.

In yet another embodiment of the invention the first electrode comprises a solid body with a minimum radial thickness $d_2$. Each lobe of the first electrode has a width $d_1$, perpendicular to the radial center line of the lobe at a radial distance half way between the base and the end of the lobe. The ratio $d_1:d_2$ is greater than 2.5:1 but not greater than 8.1:1.

Another embodiment of the invention is a primary electrochemical cell battery comprising a housing with an upstanding side wall, a first electrode comprising a first active material comprising manganese dioxide, a second electrode comprising a second active material comprising zinc, a separator disposed between the first and second electrodes, and an electrolyte comprising an aqueous solution of potassium hydroxide. At least the first electrode is a solid body, the internal surface of which defines a surface of a cavity in which the second electrode is disposed. The surface of the cavity comprises a plurality of radially extending lobes that form a plurality of concave and convex areas. Each solid body electrode lobe has a convex surface with no radius less than 0.030 inch (0.76 mm). No concave area width decreases as the radial distance from its base to its open end increases. For each first electrode lobe a ratio of the lobe width (as measured between two points on the surface of the first electrode, each of those points being a radial distance from the longitudinal axis of the cell equal to the average of the radial distance from the longitudinal axis to the outermost internal surface of the first electrode and the radial distance from the longitudinal axis to the innermost internal surface of the first electrode) to the minimum radial thickness of the first electrode is at least 2.5:1 but not greater than 8.1:1.

Among the advantages of the present invention is facilitation of high speed manufacturing of electrochemical battery cells with high electrode interfacial surface area. This is accomplished when radii in the concave interfacial surfaces of the solid electrode bodies are not less than 0.030 inch (0.76 mm). This avoids corners that are too tight to properly insert or apply separator or to properly fill with material of the other electrode at high manufacturing speeds. If separator and material of the other electrode are not properly inserted into these concave areas, there may be gaps that can increase the cell internal resistance, increase the current density and concentration polarization elsewhere, and reduce the discharge efficiency. There may also be damage to or nonuniform or insufficient coating of separator at the interface between the electrodes, which can result in nonuniform discharge or internal shorts during cell manufacture or use. Avoiding tight corners can also help to keep gaps from developing between the separator and electrodes during and after assembly. Separator materials may tend to spring back into their previous shape, which may not conform precisely with the shapes of the electrodes at their interfacial surfaces, causing gaps to occur even if there were no gaps initially.

The advantages of the present invention are also realized when, in each solid body outer electrode lobe, the perpendicular distance from the radial center line to the surface of the lobe increases as the radial distance to the ends of the adjacent lobes increases. This also facilitates assembly of the electrodes and separator and the avoidance of gaps and cell defects, in a manner similar to that described above.

These and other features, advantages and objects of the present invention will be further understood and appreciated by those skilled in the art by reference to the following specification, claims and appended drawings.

DESCRIPTION

Figure 1:
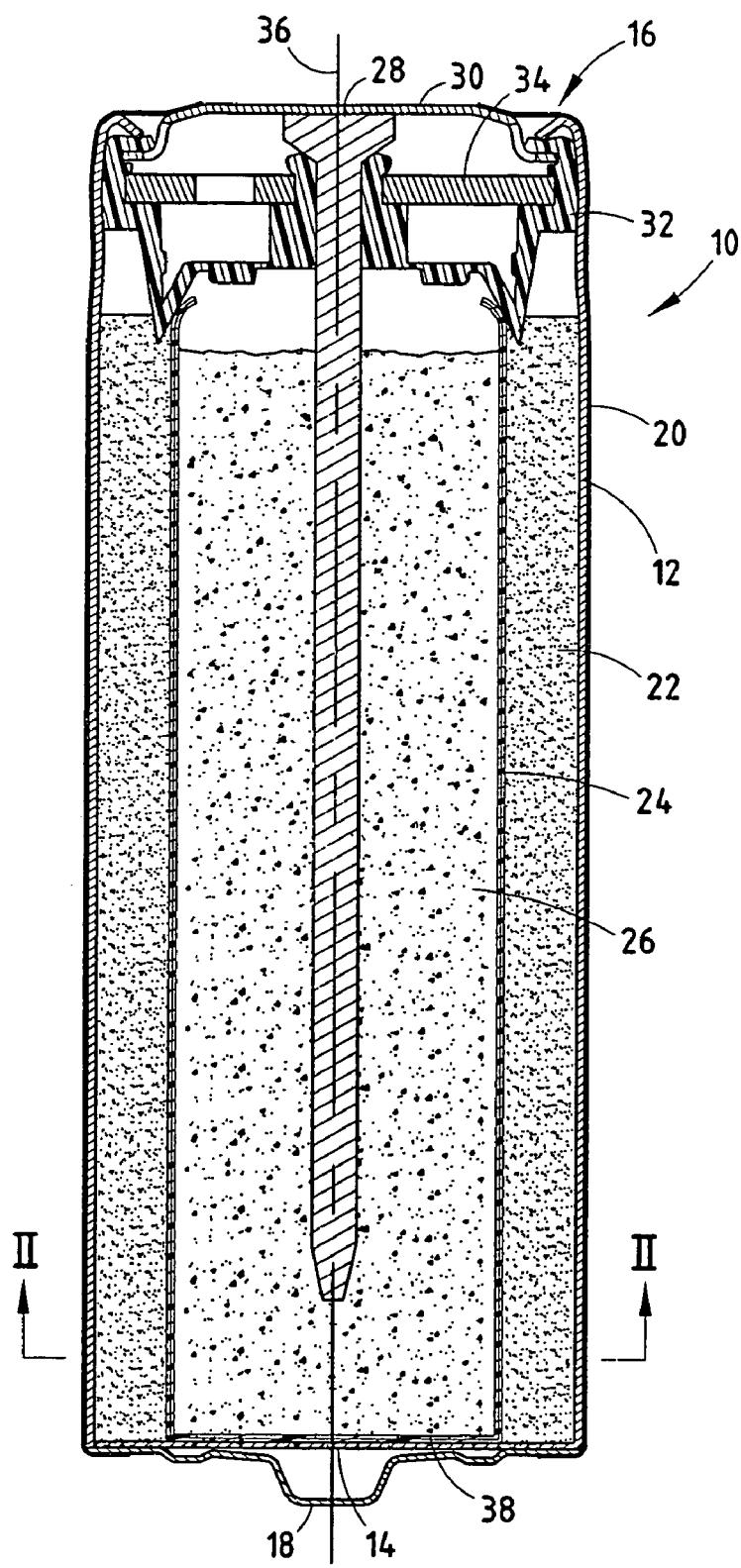
FIG. 1 is a cross-sectional view of a conventional battery cell taken along the longitudinal axis of the cell.

Unless otherwise defined herein, the meanings of words used in this specification will be their normal meanings as understood by those skilled in the art of electrochemical battery cells. The following definitions and relationships are used unless otherwise specified herein:

"solid electrode body" means an electrode that, upon assembly into the cell, is capable of maintaining the shape of its surface that interfaces with another electrode in the cell through the separator without the support of a current collector, separator or other electrode; a solid electrode body does not include gelled electrodes;

"internal," "external," "inner" and "outer" are relative to the longitudinal axis of the cell; if the cell is not symmetrical, the longitudinal axis passes through the centers of area of cross sections normal to the lengthwise dimension of the cell at the lengthwise extreme of the electrodes;

"lobe" means a projection from the surface of an electrode, not including normal variability in the electrode surface due to the nature of the component materials, the porosity of the electrode and the like;

"radial center line" means a line radiating from and normal to the longitudinal axis of the cell;

"interfacial surface" means the surface of an electrode that is adjacent the opposite polarity electrode through the separator, and "interfacial surface area" means the total area of the interfacial surface, as measured at the solid electrode (if both electrodes are solid, the interfacial surface area between the two solid electrodes is the larger of the two; if there is a third electrode, the electrode interfacial area of the cell is the sum of the interfacial surface areas between electrodes of opposite polarity in the cell);

"electrode volume" is the volume contained within the boundary surfaces of the electrode, including pores in the electrode;

"lobe base" is that part of a lobe where the lobe meets adjacent lobes;

"lobe tip" is the end of the lobe away from its base;

"open end" is that part of a concave area in an electrode surface that is between the tips of the lobes forming that concave area;

the first electrode is disposed radially outside the second electrode; the third electrode, when present, may be either the innermost or the outermost electrode; and dimensions shown in the drawings are:

$r_1$—the radial distance from the center of the cell to: the outermost internal surface of the first electrode when the first electrode is a solid body, whether or not the second electrode is also a solid body, and the outermost external surface of the second electrode when the second electrode is a solid body and the first electrode is not;

$r_2$—the radial distance from the center of the cell to: the innermost internal surface of the first electrode lobes when the first electrode is a solid body, whether or not the second electrode is also a solid body, and the innermost external surface of the second electrode when the second electrode is a solid body and the first electrode is not;

$d_1$—the width of a first electrode lobe, as measured between two points on the surface of the lobe that are each a radial distance $(r_1+r_2)/2$ from the center of the cell;

$d_2$—the minimum radial thickness of the first electrode;

$R_{1a}$—the smallest radius of the concave portion of the inner surface of the first electrode;

$R_{1b}$—the smallest radius of the convex portion of the inner surface of the first electrode;

$R_{2a}$—the smallest radius of the concave portion of the outer surface of the second electrode;

$R_{2b}$—the smallest radius of the convex portion of the outer surface of the second electrode;

$w_1$—the perpendicular distance from the center line of a first electrode lobe to a surface of the lobe; and $w_2$—the perpendicular distance from the center line of a second electrode lobe to a surface of the lobe.

Referring to FIG. 1, a conventional electrochemical battery cell 10 is shown. Cell 10 includes a housing, comprising a can with a side wall 12, a closed bottom end 14, and an open top end 16. A first terminal cover 18 is welded or otherwise attached to can bottom 14. Alternatively, can bottom 14 may be formed to include the shape of first terminal cover 18 in order to function as the first terminal and eliminate the need for a separate cover. Assembled to the open top end 16 of the can is a cover and seal assembly with a second terminal cover 30. A plastic film label 20 or other jacket may be formed about the exterior surface of the can side wall 12. Label 20 may extend over the peripheral edges of first and second terminal covers 18 and 30. A first (outer) electrode 22 is formed about the interior surface of the can. First electrode 22 is in direct contact with a portion of the can, and the can functions as first current collector, providing electrical contact between first electrode 22 and first terminal cover 18. A second (inner) electrode 26 is disposed within a cavity in first electrode 22, with a separator 24 between first and second electrodes 22 and 26. A second current collector 28 extends from second terminal cover 30 into second electrode 26 to provide electrical contact between second electrode 26 and cover 30. An annular seal 32 is disposed in the open end 16 of the can to contain the electrode materials and electrolyte in the can. An inner cover 34 provides compressive support for seal 32 to achieve the desired level of resistance to leakage of materials from cell 10. Seal 32 also electrically insulates second terminal cover 30 from the side wall 12 of the can.

Figure 2:
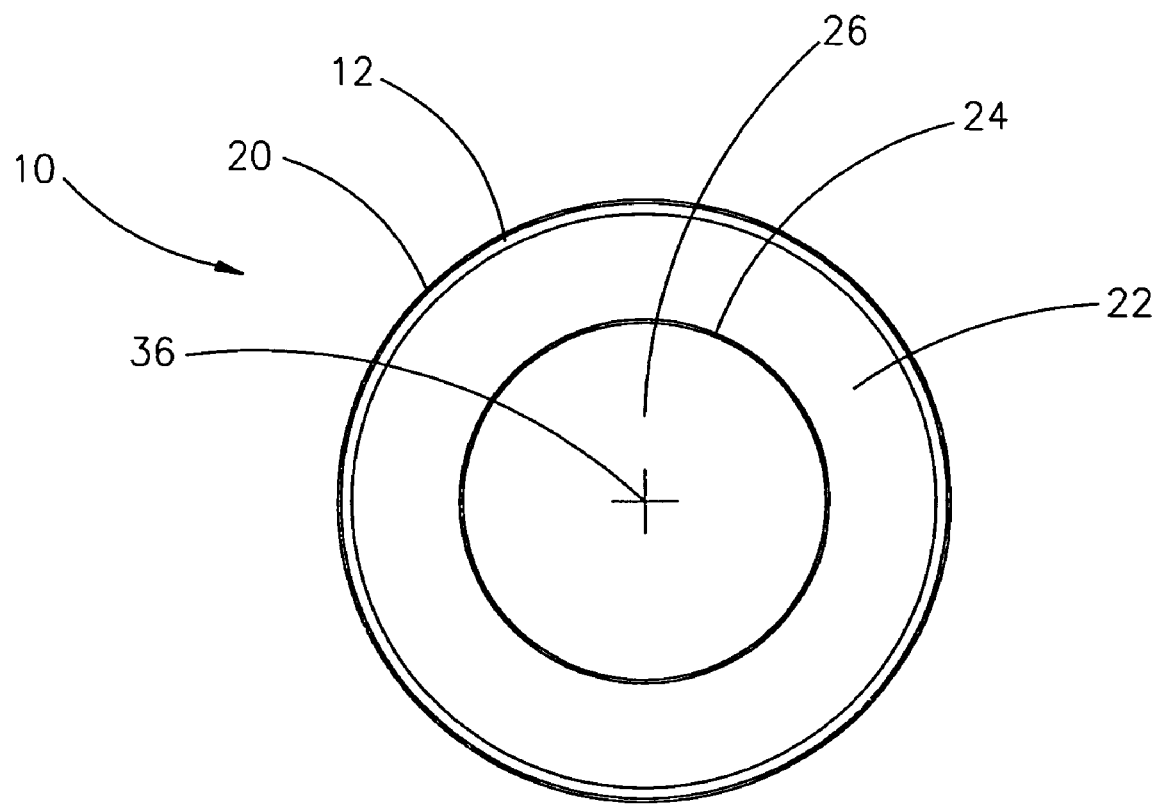
FIG. 2 is a cross-sectional view of the battery cell in FIG. 1, taken at II-II.

FIG. 2 is cross-sectional view of the cell 10 in FIG. 1 taken at II-II. In a typical alkaline zinc/manganese dioxide cell, first electrode 22 comprises a solid body. First electrode 22 has a cylindrical shape with an internal surface that is generally smooth. The external surface of first electrode 22 conforms generally to the shape of the internal surface of can side wall 12. The external surface of first electrode 22 may be in direct contact with can side wall 12, or it may be spaced apart from side wall 12, e.g., with a sheet of electrically insulating film. First electrode 22 also has an internal surface, which defines a cavity. Second electrode 26 is disposed within the cylindrical cavity defined by the internal surface of first electrode 22. Separator 24 is disposed between first electrode 22 and second electrode 26, as shown in FIG. 1. In a typical alkaline zinc/manganese dioxide cell, second electrode 26 is not a solid body, but comprises a flowable material, such as a liquid or a gel, and must be inserted into the cell after first electrode 22 and separator 24.

Figure 3:
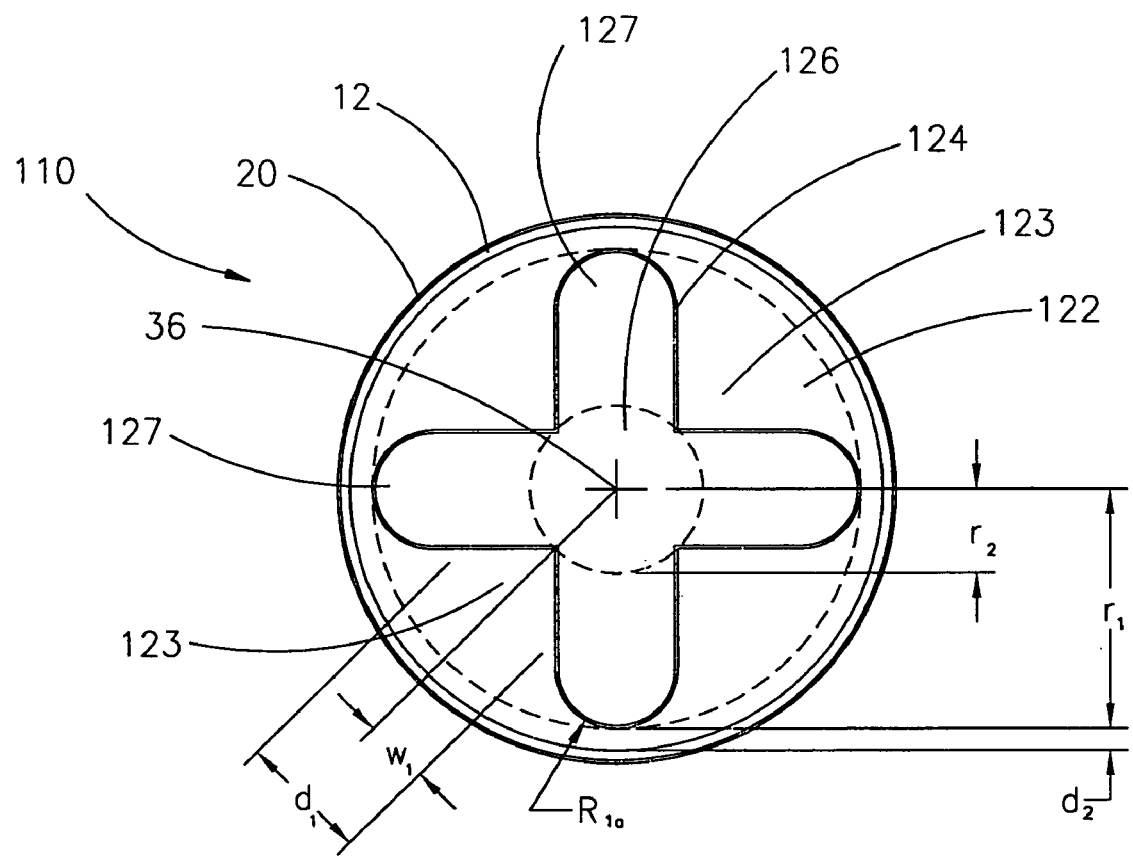
FIG. 3 is a cross-sectional view, of a first battery cell with high electrode interfacial surface area.

FIG. 3 is a cross-sectional view, similar to that in FIG. 2, but of an electrochemical battery cell 110 with an increased electrode interfacial surface area. Instead of having a smooth cylindrical inner surface, like that of first electrode 22 of conventional cell 10, first electrode 122 of cell 110 comprises a plurality of lobes 123 that project radially inward. In contrast to cell 10, in which the internal surface of first electrode 22 has a round cross section, lobes 123 of cell 110 serve to increase the perimeter length of the internal surface of first electrode 122. This increases the area of the internal surface of first electrode 122 where it interfaces with second electrode 126 through separator 124. Adjacent lobes 123 create concave areas in the internal surface of first electrode 122. Second electrode 126 has an external shape that is generally defined by the shape of the internal surface of first electrode 122 in combination with separator 124. In embodiments where second electrode 126 is a solid body, second electrode 126 has a plurality of lobes 127 that extend radially outward.

When first electrode 122 is a solid body, each of lobes 123 may have the same dimensions, as shown in FIG. 3, or lobes 123 may have different shapes and/or sizes. Each of the concave areas between adjacent lobes 123 of first electrode 122 comprises at least one radius $R_{1a}$. FIG. 3 shows a single radius $R_{1a}$ of the same size in each concave area between lobes 123, but in other embodiments the concave areas may each comprise more than one radius $R_{1a}$. Regardless of the number of radii $R_{1a}$ in each first electrode concave area, no radius $R_{1a}$ is smaller than 0.030 inch (0.76 mm). This facilitates the proper insertion of both separator 124 and second electrode 126 into the concave areas between lobes 123, without damaging separator 124 or lobes 123, and without forming gaps between the separator 124 and electrodes 122 and 126, even during high speed assembly processes. Manufacture is facilitated even more when no radius $R_{1a}$ is smaller than 0.060 inch (1.52 mm). Similarly, when second electrode 126 is a solid body, second electrode 126 comprises a plurality of lobes 127, which may have the same dimensions or have different shapes and/or sizes, and a plurality of the concave areas is formed between adjacent lobes 127 of second electrode 126.

Each lobe 123 has a radial center line, extending from longitudinal axis 36 of cell 110. The distance $w_1$, perpendicular to the radial center line, from the radial center line to the internal surface of first electrode 122 increases as the radial distance from longitudinal axis 36 increases. This, too, facilitates the proper insertion of separator 124 and second electrode 126 into the concave areas between adjacent first electrode lobes 123.

Figure 4:
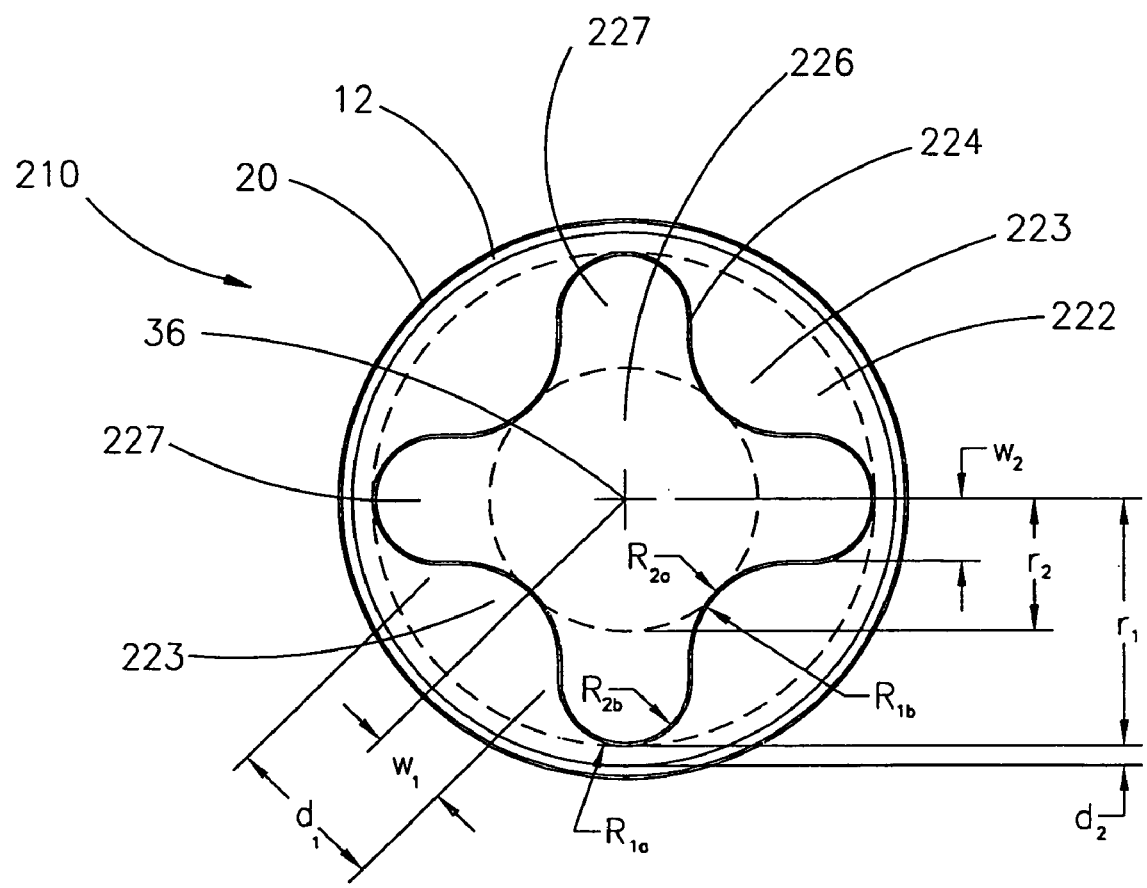
FIG. 4 is a cross-sectional view of a second battery cell with high electrode interfacial surface area.

Another cell with increased electrode surface area is shown in FIG. 4, which is similar to the cross section in FIG. 3. Cell 210 in FIG. 4 is similar to cell 110 in FIG. 3 except for the sizes and shapes of first and second electrodes 222 and 226, their corresponding lobes 223 and 227, and separator 224. In cell 210 the radius $R_{1b}$ of the convex ends of lobes 223 has been substantially increased compared to cell 110. The radius $R_{1b}$ of cell 210 is at least 0.030 inch (0.76 mm). This further facilitates assembly of separator 224, avoids gaps between separator 224 and electrodes 222 and 226, and avoids damage to both separator 224 and lobes 223. Cell manufacture is further aided when radius $R_{1b}$ is at least 0.060 inch (1.52 mm). As with the embodiment in FIG. 3, all first electrode lobes 223 can have the same dimensions, or lobes 223 may have different shapes and/or sizes. While cell 210 has a reduced electrode interfacial surface area compared to cell 110, such surface area reductions may be necessary in order to make high quality, reliable cells at acceptable speeds for large scale manufacturing.

In another variation of the embodiment shown in FIG. 4, second electrode 226 is a solid body and first electrode 222 is not a solid body. First electrode 222 is inserted into the housing after second electrode 226 and separator 224. In yet another variation, both electrodes are solid bodies. Either electrode may be inserted into the can first, or both may be inserted together, with separator 224 between them.

When second electrode 226 is a solid body, the external surface of second electrode 226 and the internal surface of the upstanding can wall 12 define a cavity into which first electrode 222 is disposed. Second electrode 226 comprises a plurality of radially outward extending lobes 227. The end of each lobe has at least one radius $R_{2b}$. Adjacent lobes 227 form a plurality of concave areas in the external surface of second electrode 226. When first electrode 222 is not a solid body, the internal shape of first electrode 222 is generally defined by the shape of the external surface of second electrode 226 in combination with separator 224. Each of the concave areas between adjacent second electrode lobes 227 has at least one radius $R_{2a}$, and whether the first electrode 222 is a solid body or not, each radius $R_{2a}$ is at least 0.030 inch (0.76 mm). Each lobe 227 has a radial center line, extending from longitudinal axis 36 of cell 210. The distance $w_2$, perpendicular to the radial center line, from the radial center line to the external surface of second electrode 226 decreases as the radial distance from longitudinal axis 36 increases. Lobes 227 and the concave areas formed between them may have the same dimensions, or they may have different shapes and/or sizes.

FIGS. 5 through 9 show yet other embodiments of the present invention. All are cross sections similar to those in FIGS. 3 and 4. Cells 310, 410, 510, 610, and 710 have: first electrodes 322, 422, 522, 622, and 722, respectively; first electrode lobes 323, 423, 523, 623, and 723, respectively; separators 324, 424, 524, 624, and 724, respectively; second electrodes 326, 426, 526, and 726, respectively; and second electrode lobes 327, 427, 527, 627, and 727, respectively. Like cells 110 and 210, either or both electrodes in cells 310, 410, 510, 610, and 710 may be solid bodies.

While the electrochemical battery cells, as shown and described herein, are Cylindrical alkaline cells, it should also be appreciated that the teachings of the present invention can be applied to various types of battery cells of other electrochemical systems and having various sizes and configurations.

The following are useful general guidelines in designing cells according to the present invention, though there are interactions that must also be considered:
(1) The volume ratio of the negative and positive electrodes should be based on the desired ratio of theoretical capacities of the negative and positive electrode active materials. This is normally established independently, based on safety, leakage and discharge performance criteria.
(2) Maximize electrode interfacial surface area for the best high power/high rate discharge performance.
(3) Improvements in high power/high rate discharge performance as a result of increased electrode interfacial surface area will be offset by the increase in the volume of separator required and a corresponding decrease in volumes of active materials.
(4) Improvements in high power/high rate discharge performance may be offset by a reduction in the volumes of active materials if solid electrodes must be strengthened (e.g., by adding binder or otherwise changing electrode formulations).
(5) If electrode interfacial surface area is increased by more than necessary to achieve the desired high power/high rate performance levels, capacity will be lower, especially at lower power/lower rate discharge.

According to guideline (3) above, the possible improvement in high rate discharge capacity from increasing the electrode interfacial surface area is partially offset by reduced amounts of active materials, because of the increased amount (and volume) of the separator needed to cover the interfacial areas of the electrodes. The effects of increased separator volume are much more apparent at low discharge rates, where discharge efficiency is much better, and the amount of active materials in the cell is a more important factor in determining discharge capacity. As the interfacial surface area increases, the discharge capacity at relatively low rates decreases because the capacity loss due to reduced active material volume is greater than the small amount of capacity gained due to increased interfacial surface area and improved discharge efficiency. Since many consumer alkaline cells are used in a wide variety of devices that discharge cells across a wide range of rates (e.g., from about 20 mA to 1000 mA and beyond), it is often desirable that there be a balance between increased surface area and increase separator volumes. The importance of minimizing separator volume increase is also greater in battery types that do not specifically target devices requiring high power discharge.

The present invention can use a variety of separator types and insertion, assembly, and application processes. The following are general considerations in selecting materials, forms, and processes. The material type must be one that is suitable for performing the intended separator functions in a cell of the electrochemical system in which it is to be used. The amount of separator material should be minimized to make the maximum amount of volume available for active materials. The amount of additional separator required for a given increase in electrode interfacial area can be minimized in a number of ways. Folds in the separator and overlaps in the separator and between separator and other insulators within the cell should be minimized, and the separator should be as thin as possible. There are limits imposed by the natures of the separator materials and the processes for making and assembling the separator into the cell. For example, the increased complexity of the shape of a first electrode with increased interfacial surface may require more folds in the separator when the separator is formed from a flat sheet. If the separator is too thin, short circuits through the separator can occur, and manufacturers often push the limits of separator thinness in conventional cells with a smooth electrode interface surface. The electrode edges and smaller radii to which the separator must conform in a cell with increased interfacial area tend to increase the minimum separator thickness required. Clearances for separator and separator insertion tooling may be smaller when the cavity in first electrode does not have a smooth, round shape, thus placing additional constraints on the selection of suitable materials and processes. While the present invention does not necessarily require a particular separator material, form, or process for assembly, application, or insertion into the cell (referred to below as separator assembly), the above considerations and other advantages and disadvantages must be taken into account. For example, if the separator material is in the form of a sheet, there are advantages and disadvantages to pre-forming the separator to more closely match the shape of the cavity in the first electrode and reduce the volume of separator folds before the separator is inserted into the cell. Forming (e.g., by thermoforming) a separator of fairly uniform thickness to closely match the shape of the cavity in the positive electrode is another alternative. Spraying a coating onto the internal surface of the first electrode, before or after the first electrode is put into the can is yet another.

Regardless of the separator material, form, and assembly process, the shape and dimensions of the cavity in the first electrode to which the separator must be placed and to which it must conform must be considered. Often those design features that facilitate separator assembly tend to reduce electrode interfacial surface area. For example, to maximize electrode interfacial surface area, the shape of the interfacial surface tends to have more projections or lobes, with sharper corners on the convex or protruding portions, smaller radii in the concave or intruding portions, and smaller open areas between protrusions. In contrast, optimum conditions for minimizing separator volume and facilitating separator assembly tend to include smooth surfaces, without sharp corners, having the largest radii possible in all curved portions of the interfacial surface, and large open areas providing the maximum clearance for assembling, inserting, or applying the separator. As with designing for maximum interfacial surface area and minimum separator volume, there must be a balance between maximizing interfacial surface area and the choices of separator material and assembly process.

Another consideration in design of a cell with increased electrode interfacial surface area is getting intimate contact between the separator and each of the electrodes, without air pockets, or voids, at the interfacial surfaces. Voids can result in incomplete utilization of active materials in the electrodes in the vicinity of the voids, particularly during discharge at higher rates. Voids between the separator and the electrodes may also result in a reduced quantity of at least one of the electrodes and/or less than an optimal match in electrode heights in the cell. Voids can also result in tearing of the separator if one electrode applies force against the separator at the void. The same factors that facilitate proper assembly of the separator also contribute to avoiding voids.

Manufacturability and durability of the solid electrodes are also considerations in the design of a cell with increased electrode interfacial surface area. Complex shapes are more difficult and expensive to form and more difficult to control in manufacturing. Sharp projections are more fragile, and material is more likely to break off during the manufacturing process as well as during handling and use of the cell. Thin areas in the electrode also make it more fragile and susceptible to breakage. In general, the same characteristics of electrode interfacial surface shape that contribute to proper separator assembly are also advantageous for electrode manufacture and assembly.

Taking the above relationships into consideration, electrochemical battery cells of the present invention have an increased electrode interfacial surface area and improved high rate discharge performance that is practical to manufacture and reliable under typical conditions of shipping, handling, use and abuse. In one aspect of the invention no radius in any concave area of the interfacial surface of a solid electrode is less than 0.030 inch (0.76 mm). In another aspect each lobe has a convex surface with no radius less than 0.030 inch (0.76 mm). In another aspect lobes do not increase in width from base to tip; the lobes may continually decrease in width from base to tip. Each of these features contributes to electrode manufacturability, electrode durability, and separator assembly but places a limit on the maximum electrode interfacial surface area that can be achieved.

In general, those compositions and materials, including those for electrodes, electrolyte and current collectors, found to be suitable and preferable for conventional cells to give good high rate and high power discharge performance will tend to be suitable and preferable in cells made according to the present invention.

As discussed above, electrodes with projections or lobes to increase the interfacial surface area are typically more fragile than those in cell 10 in FIGS. 1 and 2. Some cells have solid electrodes with a high degree of strength and structural integrity because of the nature of the materials used. In others the solid electrodes have lower strength and structural integrity. When the solid electrodes contain mixtures of discrete particles, they are more fragile than solid sheets of active metal and materials that are sintered together into a rigid mass, for example. A number of factors can contribute to the strength of such electrodes, each of which may be modified to improve the electrode strength. This is illustrated in the following example of a cathode for a $Zn/MnO_2$ cell with an aqueous alkaline electrolyte; e.g., an LR6/AA type cell. The principles disclosed can also be applied to other cell types, both cells of the invention and other cells, with solid electrodes comprising mixtures of particulate materials.

A common alkaline $Zn/MnO_2$ cell cathode comprises a mixture of $MnO_2$ active material and particles of graphite, which is used to increase the electrical conductivity of the electrode. The $MnO_2$ is often an electrolytic manganese dioxide (EMD). Suitable alkaline cell grade EMD can be obtained from Kerr-McGee Chemical Corp. (Oklahoma City, Okla., USA) and Erachem Comilog, Inc. (Baltimore, Md., USA). Preferably the EMD is a high-potential EMD (pH-voltage of at least 0.86 volt) with a potassium content less than 200 ppm, as disclosed in International Patent Publication No. WO 01/11703 A1, published 15 Feb., 2001. The graphite may be an alkaline grade graphite powder, an expanded graphite, or a mixture thereof. A suitable expanded graphite, according to International Patent Publication No. WO 99/00270, published 6 Jan. 1999, is available from Superior Graphite Co. (Chicago, Ill., USA). The mixture typically also comprises water (with or without electrolyte salt), and may also include small (typically less than 2 percent by weight) amounts of other materials, generally to improve performance in some way. Examples of such performance-enhancing materials include niobium-doped $TiO_2$, as disclosed in International Patent Application No. WO 00/79622 A1, and barium sulfate.

Alkaline cell cathode mixtures that are suitable for use will have sufficient strength to hold together, without loosing significant amounts of electrode material from the surfaces of the formed cathode during manufacture, shipping, storage and use. Alkaline cell cathodes can be strengthened in a number of ways, either alone or in combination. Increasing the minimum cathode thickness will make the cathode stronger.

In some cells a binder is added to the cathode mixture to strengthen the cathode. The binder may also have some additional desirable properties. For example, the binder may function as a lubricant when the cathode is formed or may retain electrolyte in the cell, facilitating ion mobility during discharge. In general, a minimal amount of binder (or none) is used in order to maximize the amounts of active and electrically conductive materials. When a binder is used it generally comprises about 0.1 to 6, more typically 0.2 to 2, weight percent of the solid components of the positive electrode mixture. Suitable binders for alkaline $Zn/MnO_2$ cathodes include monomers and polymers of materials such as acrylic acid, acrylic acid salts, tetrafluoroethylene, calcium stearate, acrylic acid/sodium sulfonate copolymer, and copolymers of styrene and one or more of butadiene, isoprene, ethylene butylene, and ethylene propylene. Binder materials may be used alone or in combination. CARBOPOL® 940 (an acrylic acid in the 100% acid form from B. F. Goodrich), Coathylene HA 1681 (a polyethylene from Hoechst Celanese), KRATON® G1702 (a diblock copolymer of styrene, ethylene, and propylene from Kraton Polymers Business), poly (acrylic acid-co-sodium 4-styrene sulfonate) have been found to provide good electrode strength. Mixed binders, such as a mixture of CARBOPOL® 940 and either TEFLON® T30B or TEFLON® 6C (tetrafluoroethylenes from E. I. du Pont de Nemours & Co.), can be advantageous. When a mixture of these two materials is used, a CARBOPOL® to TEFLON® weight ratio of from 1:4 to 4:1 is advantageous. In general, within this range, the higher the ratio, the stronger the cathode. For example, the cathode is stronger with a CARBOPOL® to TEFLON® weight ratio of 3:1 than with a ratio of 1:1 or 1:3. When a CARBOPOL®/TEFLON® mixture is used, the binder level in the cathode may be about 0.2 to 2, preferably 0.2 to 1, weight percent, based on the solid, undissolved components in the cathode mixture.

The cathode may also be strengthened by applying a coating to the surface of the cathode. Materials that are suitable for use as binders may be used for this purpose. The coating may penetrate to some extent into the cathode to further bind the cathode material beneath the surface. The coating material may also tend to absorb electrolyte, helping to keep the anode/cathode interface wet during discharge. The coating material may also function to some extent as a separator material, providing improved mechanical contact between the separator and the cathode. Poly (acrylic acid-co-sodium 4-styrene sulfonate) has all of these advantages.

The amount of water in the mixture, generally from about 1.5 to 8.0 percent, based on the weight of the solid, undissolved ingredients in alkaline cell cathodes prior to molding, affects electrode strength. A typical range for use in making impact molded cathodes is 6 to 8 percent. A typical range for use in ring molding is 1.5 to 6 percent, with 2 to 4 percent giving improved strength while better assuring good cathode molding.

The percent solids packing in the cathode mixture is also a factor in the cathode strength. The percent solids packing is determined by dividing the sum of (weight/real density) of solid components by the actual volume of the formed cathode. For typical alkaline cell cylindrical cathodes the packing can range from about 60 percent to about 80 percent. High packing levels provide more active materials but lower efficiency on high rate discharge due to lower water levels and poorer ion mobility in the cell. Though a relatively low packing level is desirable to maximize high rate discharge capacity, high packing is desirable to maximize cathode strength. The solids packing is typically about 70 to 79 percent, with 72 percent being most typical in impact molded cathodes and 75-79 percent being most typical in ring molded cathodes. Cathode strength generally increases with increasing solids packing, but processing considerations may introduce additional constraints for cells made using high speed processes. A number of factors can affect the solids packing. Included are: characteristics of the component materials, such as real density, intraparticle porosity, specific surface area, and particle size and shape distribution; the amount of water in the mixture during cathode forming; the force applied during cathode forming; the forming process used; and the amounts of each of the solid components. Electrolytic manganese dioxide (EMD) may be used as the $MnO_2$, and expanded natural graphite may be used as the graphite. The force applied during forming of the cathode will vary with the method of forming (e.g., ring molding or impact molding), the composition of the cathode mixture, the size and shape of the cathode, and the desired solids packing. In general, the greater the molding force, the greater the cathode strength, up to a maximum achievable solids packing level.

Alkaline cell cathodes are generally formed symmetrically around the longitudinal axis of the cell; however, they may be non-symmetrical, either intentionally or as a result of variability in the manufacturing process. Accordingly, where electrode shapes are non-symmetrical along the longitudinal axis, the invention may be applied to individual lobes, concave areas, and convex areas. The invention advantageously applies to each lobe, concave area, and convex base. Similarly, where electrode shapes vary along the longitudinal axis, the invention may be applied to individual cross sections normal to the longitudinal axis; the invention advantageously applies to each such cross section in the cell.

Two common methods of forming alkaline cell cathodes are ring molding and impact molding. In ring molding one or more (usually 3 to 5) rings are formed and then inserted into the can in a stack (one ring on top of another). Good physical and electrical contact between the can and the cathode are desirable. To achieve this the outside diameter of the rings may be made slightly larger than the inside diameter of the can to produce an interference fit, or the rings may be slightly smaller than the can to facilitate insertion, after which the rings are reformed slightly by applying force to the inside and/or top surface, thereby forcing cathode mixture firmly against the can. In impact molding the desired quantity of cathode mixture is put into the bottom of the can and molded to the desired dimensions using a ram that is inserted into the center of the can. Both methods have advantages and disadvantages. In some cells a ring molded cathode gives better high rate discharge capacity than an impact molded cathode. However, the cathode rings must be handled between molding and insertion into the can, generally requiring a stronger molded cathode than needed for impact molding. In making cells with higher interfacial electrode surface area, the ring molding process can have additional disadvantages. Because the formed electrodes are typically more fragile than those in conventional cells such as cell 10 in FIGS. 1 and 2, other means of strengthening the electrode may be necessary, as discussed above. If there are multiple stacked electrode rings in the cell, it may be necessary to orient all of the rings so the surfaces that coincide with the other electrode (e.g., the anode), adding complexity to the cell manufacturing process.

Impact molded cathodes are formed within the can and do not have to be handled separately, so the strength needed is generally much less than for ring molded cathodes. This can give the battery designer more freedom in selecting a shape that will maximize the electrode interfacial surface area. It may also minimize or eliminate the need to strengthen the cathode by means, such as adding binders, that can adversely affect cell discharge capacity.

The anode of an alkaline $Zn/MnO_2$ cell often comprises a mixture of gelled zinc particles. The zinc may be in powder or flake form, or a combination of the two. An unamalgamated zinc alloy comprising bismuth, indium, and aluminum may be advantageous. Zinc powder, preferably having a $d_{50}$ of about 110 μm, may be obtained from Umicore (Brussels, Belgium), and zinc flake (e.g., grade 5454.3) may be obtained from Transmet Corp. (Columbus, Ohio, USA). The anode also comprises water, potassium hydroxide electrolyte, and a gelling agent. Acrylic acid in the 100% acid form, such as CARBOPOL® 940 from B. F. Goodrich Specialty Chemicals (Cleveland, Ohio, USA) is a common gelling agent. Small amounts of other materials may also be added to the anode mixture and/or electrolyte to minimize gas generation in the cell and/or enhance discharge performance. Examples of such materials include $In(OH)_3$, ZnO, and sodium silicate.

The total KOH concentration in the electrolyte in the completed cell will generally be from about 36 to about 40 weight percent. The lower part of this range may be desirable for good high rate/high power discharge performance.

The anode of an alkaline $Zn/MnO_2$ cell of the present invention can be inserted into the cell in any suitable manner. The anode may be flowable when it is put into the cell and will flow by means of gravity to fill the cavity in the cathode and separator. The anode could also be dispensed into the cell under pressure, e.g., by extrusion. This may tend to fill the anode cavity more completely, though there may be an increased risk of damage to the separator, especially if there are voids between the separator and the interfacial surface of the cathode.

In another embodiment of the invention, the second electrode may be the solid electrode rather than the first electrode, as in the embodiment described above. In such an embodiment the method of assembling the cell may have to be modified. For example, if the solid second electrode is inserted first, it may have to be held in position while the first electrode is dispensed into the cavity between the second electrode and the can. Alternatively, the first electrode may be dispensed into the can, followed by insertion of the second electrode, with the separator disposed thereon, forcing the flowable first electrode upward to fill the cavity between the second electrode and the can.

In yet another embodiment of the invention, in which both the first and second electrodes are solid bodies, one of the electrodes may be flowable until after the electrodes and separator are assembled into the cell, when the flowable electrode is rendered solid. Alternatively, the first and second electrodes may be assembled together with the separator before insertion into the can. In such an embodiment the interfacial surface of one electrode would be a close match to the shape of the interfacial surface of the other electrode to provide intimate contact, without voids, between the separator and both electrodes. To assemble the electrodes and separator outside the can, the first electrode may be comprised of two or more sections that are mated together around the separator and the second electrode. In an alternative method, the interfacial surfaces of both electrodes may be vertically tapered to facilitate insertion of one electrode into the cavity in the other.

A cell of the present invention may also comprise one or more additional electrodes, with the electrodes arranged in a coaxial manner, as long as at least one interfacial surface has a plurality of lobes, according to the invention, for increasing the interfacial surface area. The additional electrode may be disposed outside the first electrode or inside the second electrode, or two additional electrodes may be used, one outside the first electrode and one inside the second electrode. The electrodes may have alternating polarities. This type of arrangement further increases the total interfacial surface area between anodes and cathodes.

The current collectors used in the invention may be any current collectors that would be recognized as suitable. Current collectors will be stable in the internal environment of the cell, will have a suitable electrical conductivity, and will have good electrical contact with the electrode. When the outer electrode is a solid body, the can often serves as its current collector. Current collectors may also be other structures of varying shapes and numbers, depending in part on the electrode material, shape, and location in the cell. For example, one or more pins, nails, strips, or screens, or a combination thereof, may be used.

Table 1 below summarizes electrode dimensions for exemplary LR6/AA size cells with electrodes according to FIGS. 3-9, as well as the ratios of $d_1:d_2$, surface area, and volume.

ity will be too low and/or the ratio of anode to cathode will be outside the range desired for safety. If $d_2$ is too small, the cathode will be too fragile. Once $d_2$ is established, the radial distances from the center of the cell to the ends and bases of the lobes ($r_2$ and $r_1$, respectively) must be selected so as to provide a sufficient increase in interfacial surface area without requiring too much additional separator or creating shapes that make assembly of the separator and proper dispensing of the anode into the cell too difficult. In LR6/AA size cells $d_2$ is advantageously at least 0.40 mm but no greater than 1.20 mm, $r_2$ is advantageously at least 3.20 mm but no greater than 3.70 mm, and $r_1$ is advantageously at least 5.60 mm but not more than 6.30 mm.

LR6/AA cells of the invention will typically have a ratio of the electrode interfacial surface area to the cathode volume of about $0.45 \text{ mm}^2:1 \text{ mm}^3$ to $0.60 \text{ mm}^2:1 \text{ mm}^3$, advantageously about $0.49 \text{ mm}^2:1 \text{ mm}^3$ to $0.60 \text{ mm}^2:1 \text{ mm}^3$. If the ratio is too high, cell manufacture will be difficult. If it is too low, the increase in interfacial surface area over a cell having no lobes on the interfacial surface will be small.

TABLE 1

Figure 5:
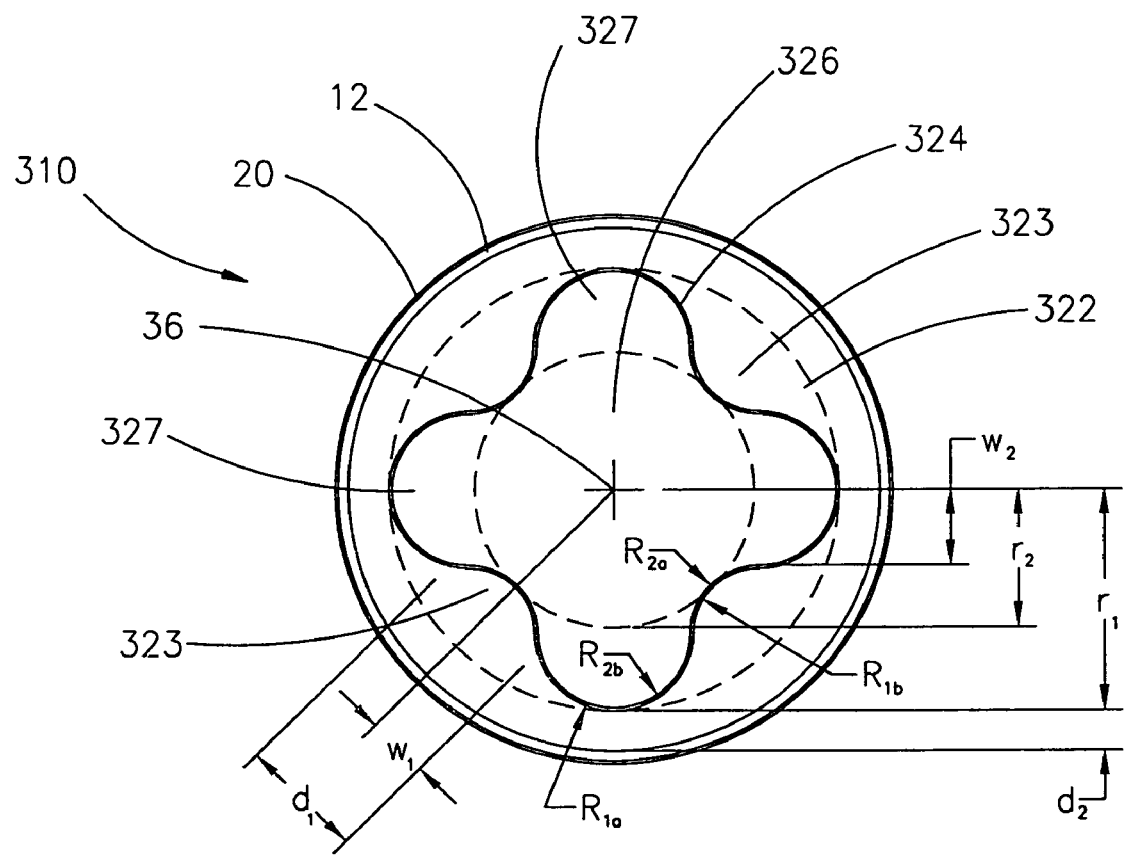
FIG. 5 is a cross-sectional view of a third battery cell with high electrode interfacial surface area.
Figure 6:
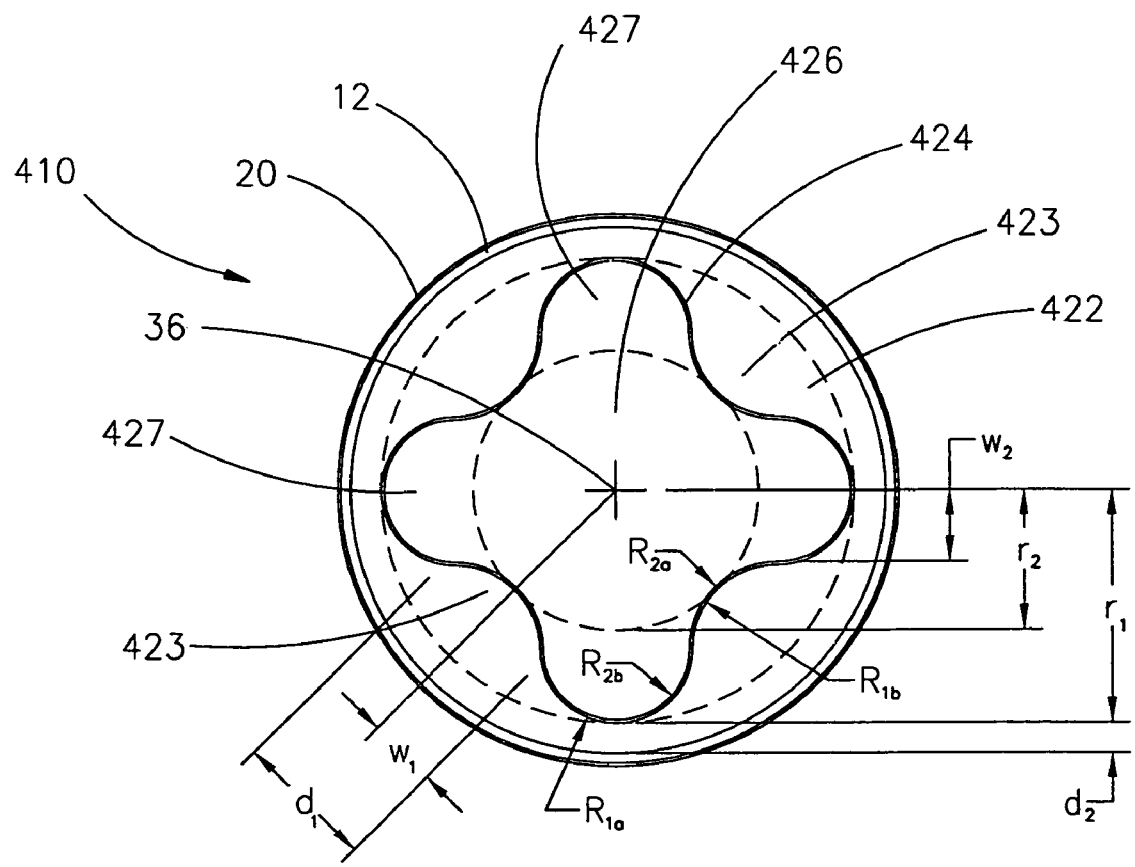
FIG. 6 is a cross-sectional view of a fourth battery cell with high electrode interfacial surface area.
Figure 7:
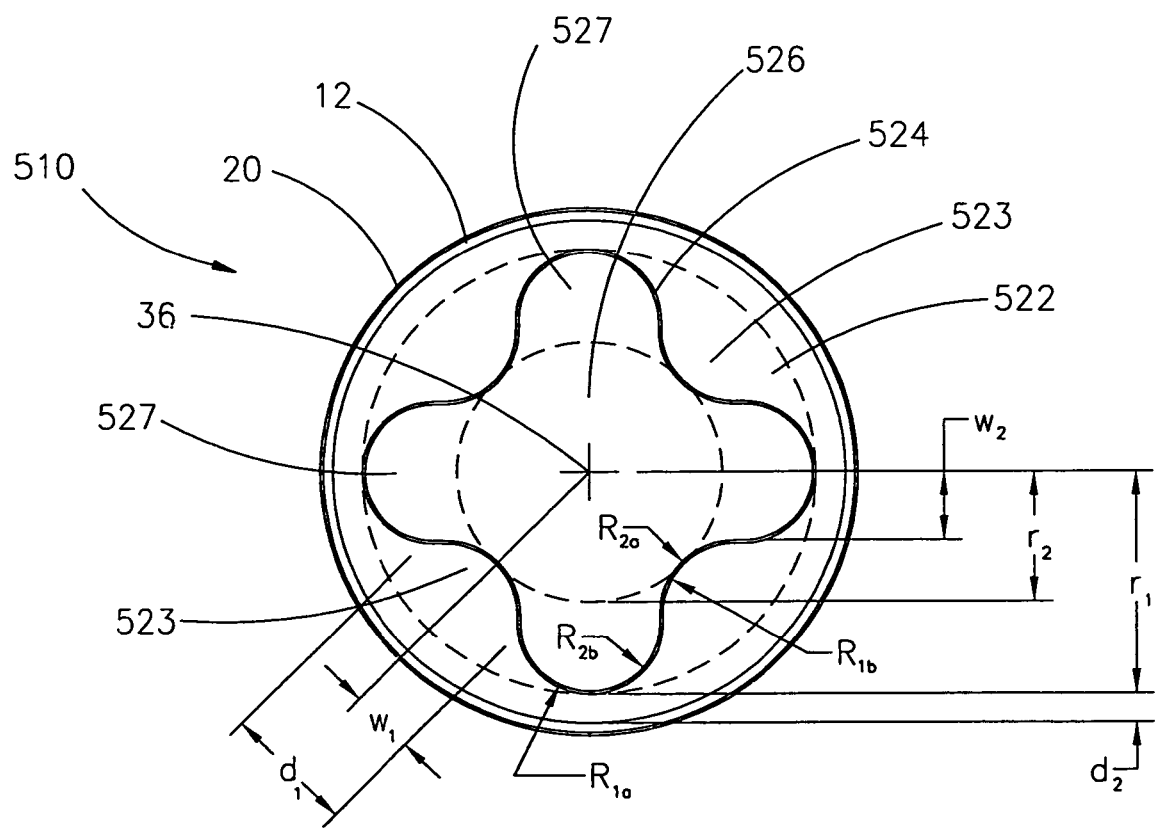
FIG. 7 is a cross-sectional view of a fifth battery cell with high electrode interfacial surface area.
Figure 8:
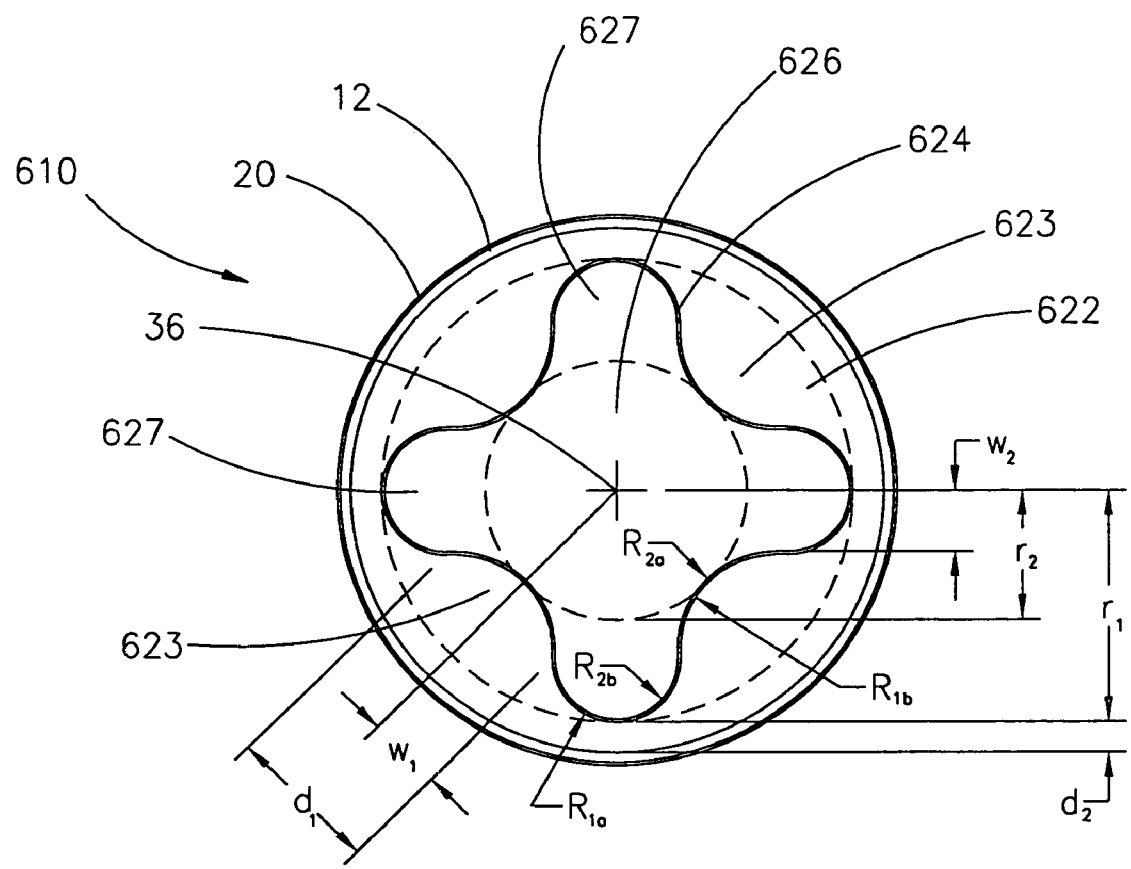
FIG. 8 is a cross-sectional view of a sixth battery cell with high electrode interfacial surface area.
Figure 9:
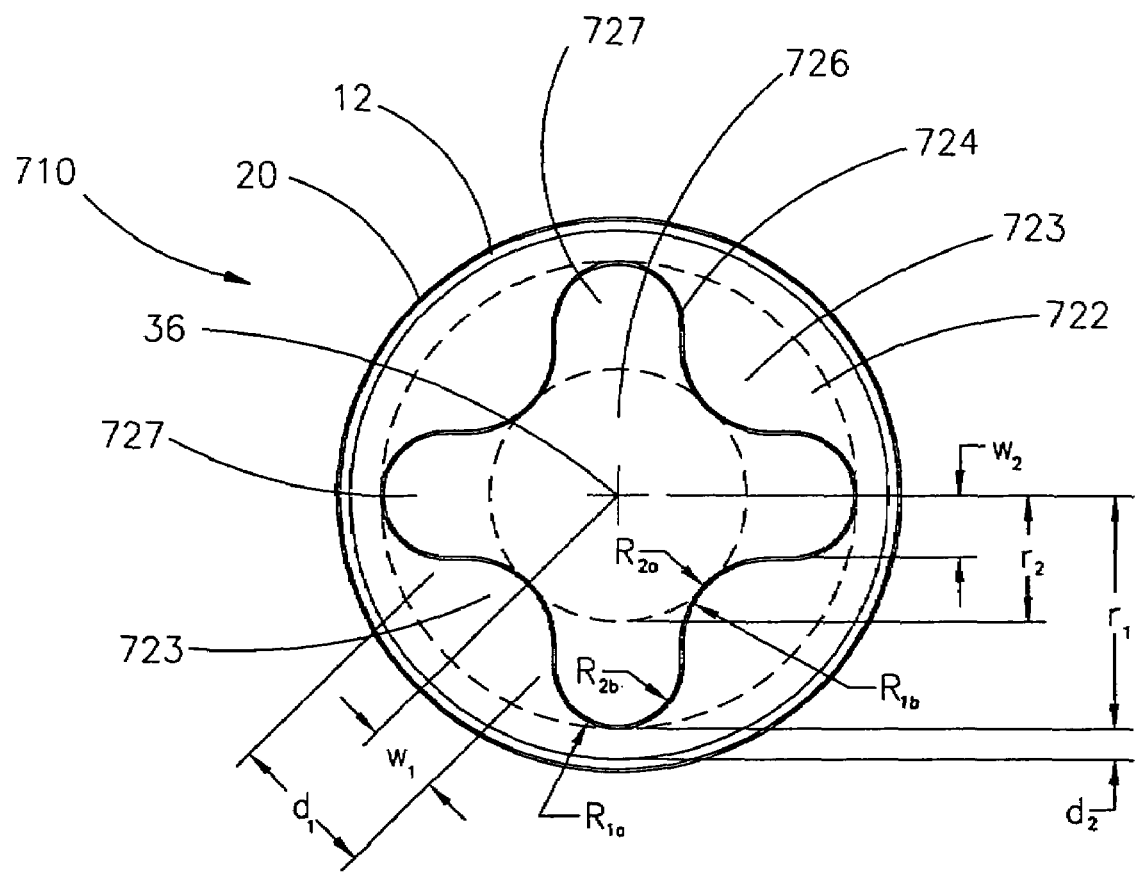
FIG. 9 is a cross-sectional view of a seventh battery cell with high electrode interfacial surface area.

| | Drawing | | | | | | |
|---|---|---|---|---|---|---|---|
| | FIG. 3 | FIG. 4 | FIG. 5 | FIG. 6 | FIG. 7 | FIG. 8 | FIG. 9 |
| | | | | Cell | | | |
| | 110 | 210 | 310 | 410 | 510 | 610 | 710 |
| $r_1$ (mm) | 6.15 | 6.21 | 5.68 | 5.93 | 5.93 | 5.93 | 5.93 |
| $r_2$ (mm) | 2.16 | 3.31 | 3.53 | 3.57 | 3.46 | 3.31 | 3.21 |
| $d_1$ (mm) | 3.30 | 4.01 | 3.14 | 3.54 | 3.44 | 3.80 | 3.72 |
| $d_2$ (mm) | 0.56 | 0.50 | 1.03 | 0.78 | 0.78 | 0.78 | 0.78 |
| $w_1$ with increasing distance from center | incr. | incr. | incr. | incr. | incr. | incr. | incr. |
| $R_{1a}$ (mm) | 1.52 | 1.64 | 2.02 | 1.89 | 1.89 | 1.64 | 1.64 |
| $R_{1b}$ (mm) | near 0 | 2.40 | 1.64 | 2.15 | 1.89 | 2.40 | 2.15 |
| $d_1:d_2$ | 5.90 | 8.02 | 3.05 | 4.56 | 4.44 | 4.90 | 4.80 |
| $1^{st}$ electrode surface area (mm$^2$) | 1867 | 1698 | 1517 | 1586 | 1603 | 1603 | 1622 |
| $1^{st}$ electrode volume (mm$^3$) | 3384 | 2991 | 3018 | 2891 | 2930 | 3143 | 3188 |

While the cells in Table 1 are LR6/AA size cells, the invention is suitable for use in other cell sizes as well, including LR03/AAA, LR14/C, and LR20/D sizes. The typical can inside diameters (and cathode outside diameters) for these cell sizes range from about 10 to about 35 mm, compared to about 12.7 to 14.0 for LR6/AA cells. In general, there is more freedom in designing cells in which the cathodes are larger in diameter. For example, it is possible to increase the electrode interfacial surface area by increasing the number of lobes in the electrode surface. There is a limit to the number of lobes that is possible without having surfaces that are not conducive to high speed manufacturing. The number of lobes that can be used in cells according to the invention increases as the outside diameter of the cathode increases. For example, in an LR03/AAA cell it is difficult to manufacture a cell with more than 3 lobes, while in an LR20/D cell 6 lobes or more are possible.

In cells made according to the invention, the minimum radial thickness ($d_2$) of the cathode will generally be less than the radial thickness of the cathode of a cell such as cell 10 in FIG. 2. If $d_2$ is too large, increasing the electrode interfacial surface area enough to realize a significant improvement in high rate discharge efficiency will reduce the volume available for the anode to the point that the theoretical input capac- In order to maximize discharge efficiency, it would be desirable to have a very uniform shallow cathode depth from the interfacial surface with the anode throughout the cathode. To manufacture a cell with a cathode having such a shape as well as a high interfacial surface area compared to that in a cell similar to the one in FIG. 2 would be very difficult, as disclosed above. Therefore, manufacturing considerations will place practical limits on the uniformity of cathode depth from the interfacial surface of the cathode. A uniform lobe width from base to tip and a $d_1:d_2$ ratio of about 2:1 would be ideal for maximizing discharge efficiency. As described above and illustrated in FIGS. 3-9, cells that are practical to manufacture do not have uniform lobe widths. Such cells will often have a $d_1:d_2$ ratio of at least 2.5:1. Cells with a $d_1:d_2$ ratio of at least 3.0:1 are more easily made, and cells with a ratio of at least 4.0:1 are even more easily manufactured. Because impact molded cathodes do not have to be handled outside the cell, $d_2$ can be made smaller than in impact molded cells, and cells with $d_1:d_2 \geq 6.5$, or even $\geq 7.0$, are practical. If $d_1:d_2$ is greater than 8.1:1, the high rate discharge improvement resulting from increasing the interfacial surface area may be offset more than desired because of nonuniform discharge of the cathode.

The features and advantages of the invention are illustrated in view of the following examples.

EXAMPLE 1

Conventional LR6/AA alkaline Zn/MnO$_2$ cells were made with a design as shown in FIGS. 1 and 2 and described above.

Cathode mixture was made by blending together electrolytic manganese dioxide (EMD) and expanded graphite, in a weight ratio of 17:1, small amounts (less than 1 weight percent each) of BaSO$_4$ and Nb-doped TiO$_2$, 7.8 weight percent of 45 weight percent KOH solution, and 1.6 weight percent of deionized water. Cathodes were impact molded into steel cans with an inside diameter of 0.528 inch (13.4 mm). The cans were 0.010 inch (0.254 mm) thick, with nickel plating on the outside surface, and coated with a graphite coating on the inside surface. Nominally 10.8 g of cathode mixture was put into each cell, and the cathodes were molded to a height of 1.674 inches (42.52 mm) and an inside diameter of 0.370 inch (9.40 mm), with 73.2 volume percent solids packing. The radial thickness of the molded cathodes was 0.079 inch (2.01 mm), the area of the inner surface of the cathode was 1.946 in$^2$ (1255 mm$^2$), and the cathode volume was 0.1867 in$^3$ (3060 mm$^3$).

After forming the cathode in the can, the separator was cut, formed into a roughly cylindrical shape, and inserted into the cavity formed by the inner surface of the cathode and the bottom of the can. The separator was made from 0.004 inch (0.10 mm) thick grade VLZ 105 from Nippon Kodoshi Corporation of Kochi-ken, Japan, and was 2.244 inches (57.00 mm) long×2.165 inches (54.99 mm) high. The cut separator was scrolled along its length around a mandrel. The scrolled separator was folded inward at the bottom to form a basket shape to cover and conform to the sides and bottom of the inner surface of the cathode and can bottom. The formed separator was heated to seal the separator layers and maintain its shape during insertion into the cell.

After inserting the formed separator into the cell, 1.19 g of 37 weight percent KOH in deionized water was added to each cell to soak the separator.

Anode gel mixture was made by blending together the following (all percentages based on weight): 69.00 percent zinc alloy powder, 0.44 percent gelling agent, 29.39 percent electrolyte solution, 0.02 weight percent In(OH)$_3$, and 1.15 weight percent 0.1 N KOH. The electrolyte solution contained 40 percent aqueous KOH (96.7 percent), ZnO (3.0 percent), and sodium silicate (0.3 percent). 6.04 g of anode mixture was dispensed into the cavity in the separator in each cell.

The nominal ratio of anode to cathode theoretical input capacities in each cell was 0.99:1, based on an assumed 1.33 electron discharge of the EMD. The nominal overall KOH concentration in each cell (anode, cathode, and separator) was 37.3%.

The cells were closed by placing an anode collector assembly, including a current collector nail, a seal, and a cover, into the open end of the can, followed by a negative terminal cover. The collector assembly and terminal cover were held in place and the cell sealed by crimping the top edge of the can inward and over the top of the seal and terminal cover.

The cells were completed by welding a positive terminal cover to the bottom of the can and placing a label over the outside of the can, extending over ends of the cell.

EXAMPLE 2

Cells were made in the manner described in Example 1, except for the following. The cross-sectional shape of the cathode corresponded to that of cell 210 in FIG. 4. Table 1 summarizes key dimensions and dimensional relationships (cell 210). Because of the increased electrode interfacial surface area compared to Example 1, more separator was needed. The cut separator was 3.07 inches (77.97 mm) long× 2.165 inches (54.99 mm) high, and the amount of electrolyte added after separator insertion was increased to 1.29 g.

EXAMPLE 3

Cells were made in the manner described in Example 2, except for the following. The cross-sectional shape of the cathode corresponded to that of cell 310 in FIG. 5, and the electrode dimensions were those shown for cell 310 in Table 1. The cut separators were 3.07 inches (77.97 mm) long× 2.165 inches (54.99 mm) high, and the amount of electrolyte added after separator insertion was 1.29 g.

EXAMPLE 4

Cells were made in the manner described in Example 2, except for the following. The cross-sectional shape of the cathode corresponded to that of cell 710 in FIG. 9, and the electrode dimensions were those shown for cell 710 in Table 1. The cut separators were 3.07 inches (77.97 mm) long× 2.165 inches (54.99 mm) high, and the amount of electrolyte added after separator insertion was 1.29 g.

EXAMPLE 5

Cells from Examples 1, 3, and 4 were discharged continuously at 1000 milliwatts to 1.0 V at 21° C. Other cells from Examples 1, 2, and 3 were discharged continuously at 1000 milliamps to 1.0 V at 21° C. The results are summarized in Table 2 below. The cathode surface areas and discharge durations are normalized (indexed), with the surface areas and durations for the comparative cells of Example 1 set at 100%.

TABLE 2

|  | Example | | | |
|---|---|---|---|---|
|  | 1 | 2 | 3 | 4 |
|  | | Drawing FIG. | | |
|  | 2 | 4 | 5 | 9 |
|  | | Cell | | |
|  | 10 | 210 | 310 | 710 |
| Cathode surface area (mm$^2$) | 1188 | 1698 | 1517 | 1622 |
| Cathode surface area (%) | 100 | 143 | 128 | 137 |
| 1000 mW discharge duration (%) | 100 | — | 106 | 125 |
| 1000 mA discharge duration (%) | 100 | 124 | 109 | — |

As shown in Table 2, the cathode interfacial surface area was increased over that of the conventional cells in Example 1 by 43% in Example 2, 28% in Example 3, and 37% in Example 4. As discussed above, the advantage of increased surface area is partially offset by an increase in separator volume and a corresponding reduction in the amount of active materials that can be put into a cell.

EXAMPLE 6

Cells were made in the manner described in Example 2, except for the following. The cross-sectional shape of the cathode corresponded to that of cell 110 in FIG. 3, and the electrode dimensions were those shown for cell 110 in Table 1. Processing problems were observed. Because of the sharp corners at the ends of the cathode lobes 123, it was difficult to get the separator 124 to conform to the inner surface of the cathode at those corners and remain there. As a result, there were spaces, or gaps, between the cathode 123 and separator 124 in those areas, it was difficult to get all of the anode material into the anode cavity, and the effective anode/cathode interfacial surface area was reduced. These problems caused a high incidence of substandard cells, and the discharge capacity of these cells was not tested. For best results, cells with sharp-ended electrode lobes have separator materials that will conform easily to the lobe surfaces. For separator materials that are resilient (i.e., tending to spring back into a previous shape), such as those used in Examples 1-4, rounded electrode lobe ends, particularly lobes which have no convex surface radius less than 0.030 inch (0.76 mm), are useful to avoid the processing problems observed in Example 6. Processing problems are further reduced when no convex surface radius is less than 0.060 inch (1.52 mm).

EXAMPLE 7

LR20/D size cells were made in a manner similar to that for the cells in Example 3. The cathode shape was similar to that of cell 210 in FIG. 4 and had the following nominal dimensions: $r_1=0.549$ inch (13.94 mm), $r_2=0.316$ inch (8.03 mm), $d_2=0.090$ inch (2.29 mm), $R_{1a}=0.1505$ inch (3.82 mm), $R_{1b}=0.248$ inch (6.30 mm), and cathode height=2.035 inch (51.69 mm). This resulted in a cathode volume of 1.421 in$^3$ (23,298 mm$^3$) and an interfacial surface area of 7.020 in$^2$ (4,529 mm$^2$), or 127% of the interfacial surface area of a conventional LR20/D size cell with a cylindrical cathode of 0.867 inch (22.02 mm) inside diameter. Even though the electrode dimensions of the cells in Example 7 were not optimized, and the separators were not properly formed, leaving a gap of about 0.05 inch (1.27 mm) between the separator and the cathode at the bases of the cathode lobes, the discharge durations of these cells at 1000 mA to 1.0 V averaged about 116% of conventional cells.

As demonstrated in the above examples, cells made according to the invention provide improved high rate discharge duration over conventional cells and avoid shortcomings of previous methods to do so.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. An electrochemical battery cell comprising:
   a housing with an upstanding side wall;
   a first electrode comprising a first active material;
   a second electrode comprising a second active material disposed within the first electrode;
   a separator disposed between the first and second electrodes;
   an electrolyte; and
   a cell longitudinal axis;
   wherein:
      at least one of the first and second electrodes comprises a solid body having a surface with a plurality of radially extending lobes, each having a base, a tip and a radial center line, that form a plurality of concave and convex areas in its surface;
      each concave and convex area in the surface of the solid body has no radius less than 0.76 mm; and
      each lobe has a width that continually decreases as a distance along its radial center line from its base to its tip increases.

2. The cell defined by claim 1, wherein each concave area has no radius less than 1.52 mm.

3. The cell defined by claim 2, wherein each convex area has no radius less than 1.52 mm.

4. The cell defined by claim 1, wherein the first electrode comprises a solid body having a plurality of radial extending lobes.

5. The cell defined by claim 4, wherein:
   the first electrode has a minimum radial thickness $d_2$;
   each lobe in the first electrode has a width $d_1$, measured between two points on its surface, the two points being on opposite sides of the lobe at a radial distance from the longitudinal axis equal to an average of a radial distance from the longitudinal axis to an outermost point on the surface of the first electrode and a radial distance from the longitudinal axis to an innermost point on the surface of the first electrode; and
   a ratio $d_1:d_2$ is greater than 2.5:1 but not greater than 8.1:1.

6. The cell defined by claim 5, wherein the ratio $d_1:d_2$ is at least 3.0:1.

7. The cell defined by claim 6, wherein the ratio $d_1:d_2$ is at least 4.0:1.

8. The cell defined by claim 7, wherein the ratio $d_1:d_2$ is at least 6.5:1.

9. The cell defined by claim 4, wherein the second electrode is non-solid.

10. The cell defined by claim 1, wherein:
    the second electrode comprises a solid body with an external surface;
    the first electrode has a minimum radial thickness;
    the first electrode has an internal surface with a plurality of lobes defined by an external surface of the second electrode solid body and the separator;
    each first electrode lobe has a width, measured between two points on the the internal surface, the two points being on opposite sides of the lobe at a radial distance from the longitudinal axis equal to an average of a radial distance from the longitudinal axis to an outermost point on the internal surface and a radial distance from the longitudinal axis to an innermost point on the internal surface; and
    a ratio of each first electrode lobe width to its minimum radial thickness is greater than 2.5:1 but not greater than 8.1:1.

11. The cell defined by claim 1, wherein the cell is a cylindrical cell.

12. The cell defined by claim 11, wherein the housing has an inside diameter from 10 mm to 35 mm.

13. The cell defined by claim 1, wherein the cell is a noncylindrical cell and the housing has an inside width through a longitudinal axis of the cell from 10 mm to 35 mm.

14. An electrochemical battery cell comprising:
    a housing with an upstanding side wall;
    a first electrode comprising a first active material and having an internal surface;
    a second electrode comprising a second active material disposed within the first electrode and having an external surface adjacent to the internal surface of the first electrode;
    a separator disposed between the first and second electrodes;
    an electrolyte; and a cell longitudinal axis;

wherein:

the first electrode comprises a solid body having a plurality of radially extending lobes, each having a base, a tip and a radial center line, that form a plurality of concave and convex areas in its internal surface;

each concave area has no radius less than 1.52 mm;

the first electrode has a minimum radial thickness $d_2$;

each lobe has a width $d_1$, as measured between two points on the internal surface, each of the two points a radial distance from the longitudinal axis equal to an average of a radial distance from the longitudinal axis to an outermost point on the internal surface and a radial distance from the longitudinal axis to an innermost point on the internal surface;

a ratio $d_1:d_2$ is greater than 2.5:1 but not greater than 8.1:1; and each lobe width continually decreases as a distance along its radial center line from its base to its tip increases.

15. The cell defined by claim 14, wherein each convex area in the surface of the first electrode has no radius less than 1.52 mm.

16. The cell defined by claim 14, wherein the cell is a cylindrical cell, and the housing has an inside diameter from 10 mm to 35 mm.

17. The cell defined by claim 14, wherein the cell is a noncylindrical cell, and the housing has an inside width perpendicular to the longitudinal axis from 10 mm to 35 mm.

18. An electrochemical battery cell comprising:

a housing with an upstanding side wall;

a first electrode comprising a first active material and having an internal surface;

a second electrode comprising a second active material disposed within the first electrode and having an external surface adjacent to the internal surface of the first electrode;

a separator disposed between the first and second electrodes;

an electrolyte; and a cell longitudinal axis;

wherein:

at least one of the first and second electrodes comprises a solid body having a plurality of radially extending lobes, each having a base, a tip and a radial center line, that form a plurality of concave and convex areas in its surface;

the housing has an inside diameter no greater than 14.0 mm when the cell is a cylindrical cell and an inside width through a longitudinal axis of the cell no greater than 14.0 mm when the cell is a noncylindrical cell; and each concave and convex area has no radius less than 1.52 mm.

19. The cell defined by claim 18, wherein each lobe has a width that continually decreases as a distance along its radial center line from its base to its tip increases.

20. The cell defined by claim 19, wherein:

the first electrode has a minimum radial thickness $d_2$;

each lobe in the first electrode has a width $d_1$, measured between two points on its surface, the two points being on opposite sides of the lobe at a radial distance from the longitudinal axis equal to an average of a radial distance from the longitudinal axis to an outermost point on the surface of the first electrode and a radial distance from the longitudinal axis to an innermost point on the surface of the first electrode; and a ratio $d_1:d_2$ is greater than 2.5:1 but not greater than 8.1:1.

* * * * *